(No Model.) 4 Sheets—Sheet 1.
JAMES CLEMENTS, JOHN CLEMENTS & F. H. ROLLINS.
CORN HARVESTING MACHINE.
No. 477,169. Patented June 14, 1892.
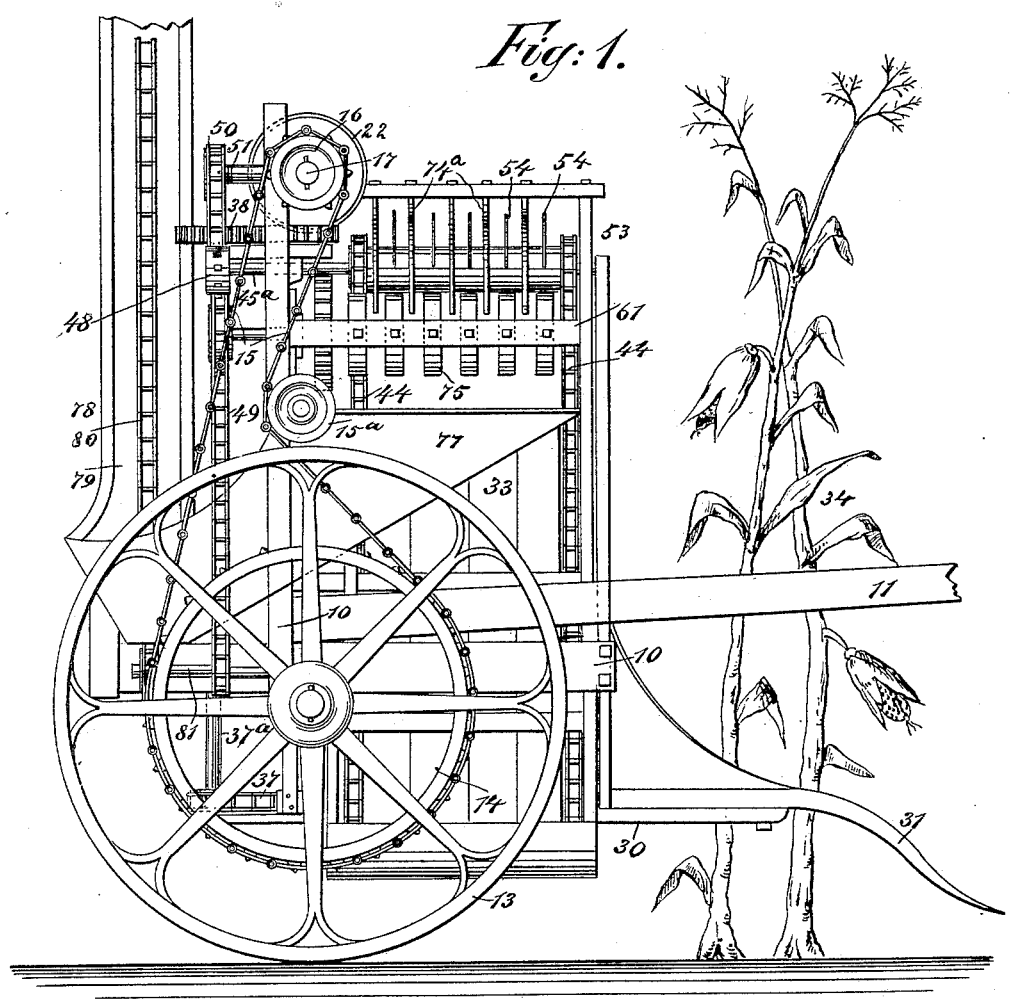
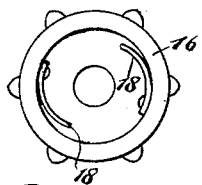
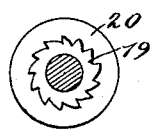
WITNESSES:
INVENTORS:
ATTORNEYS (No Model.) 4 Sheets—Sheet 2.
JAMES CLEMENTS, JOHN CLEMENTS & F. H. ROLLINS.
CORN HARVESTING MACHINE.
No. 477,169. Patented June 14, 1892.
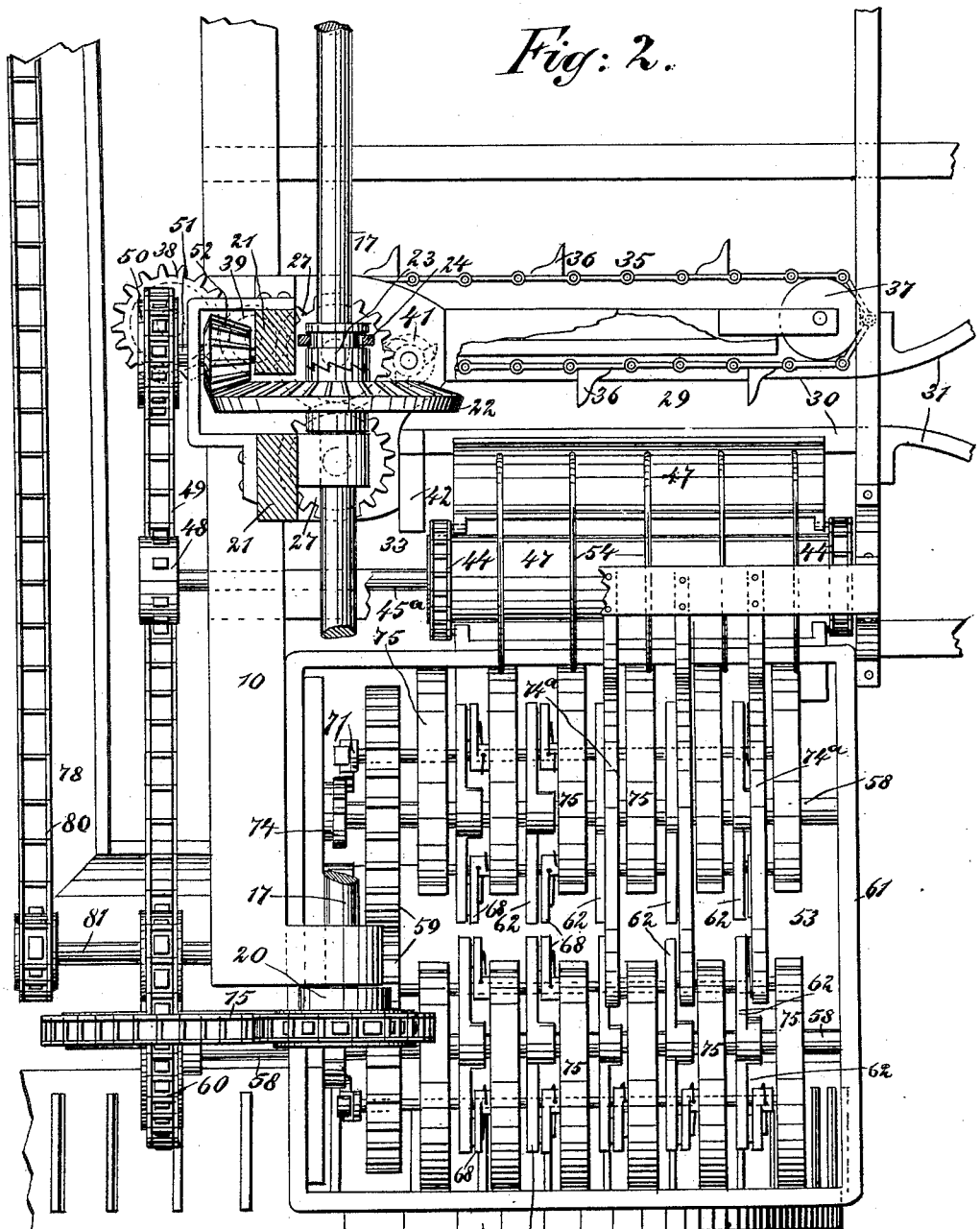

(No Model.) 4 Sheets—Sheet 3.
JAMES CLEMENTS, JOHN CLEMENTS & F. H. ROLLINS.
CORN HARVESTING MACHINE.
No. 477,169. Patented June 14, 1892.
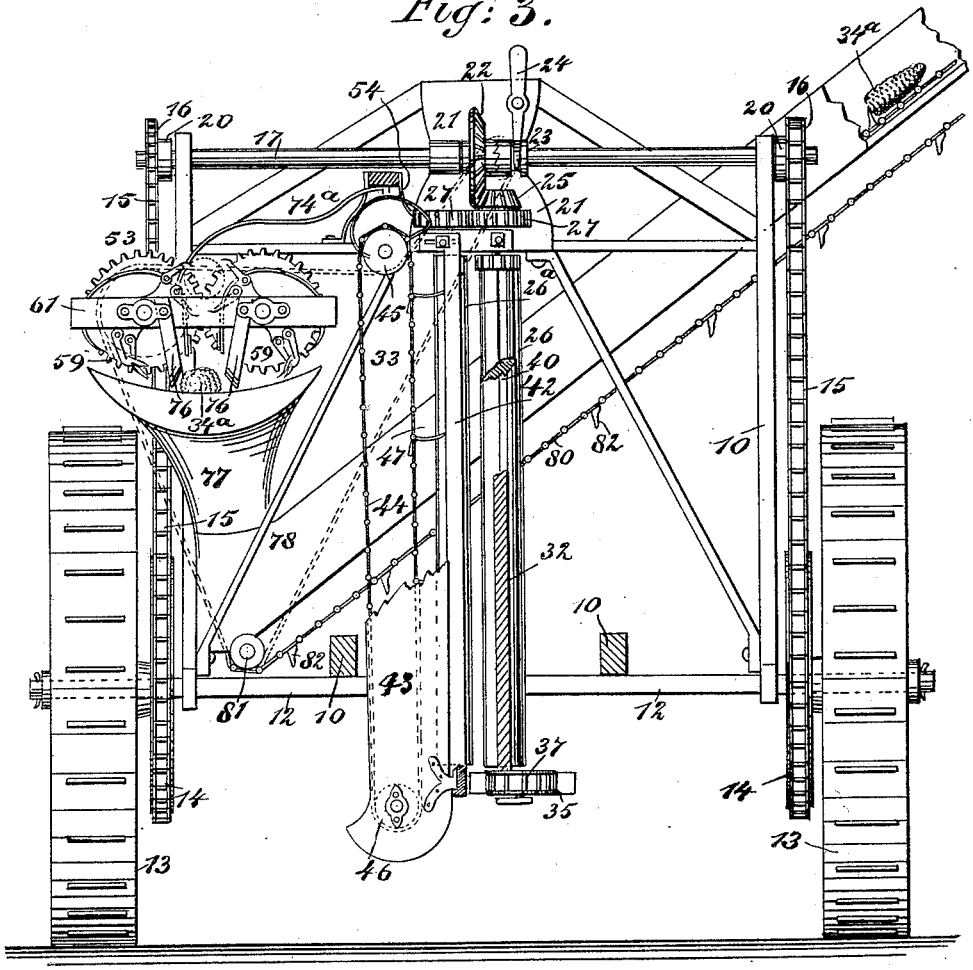
Fig: 3.
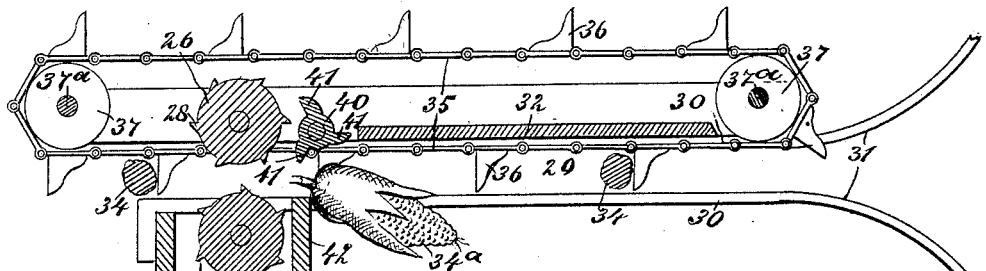
Fig: 4.
WITNESSES:
Chas. Niola.
C. Sedgwick.
INVENTORS:
J. Clements
J. Clements
BY F. H. Rollins
Munn & Co.
ATTORNEYS (No Model.) 4 Sheets—Sheet 4.
JAMES CLEMENTS, JOHN CLEMENTS & F. H. ROLLINS.
CORN HARVESTING MACHINE.
No. 477,169. Patented June 14, 1892.
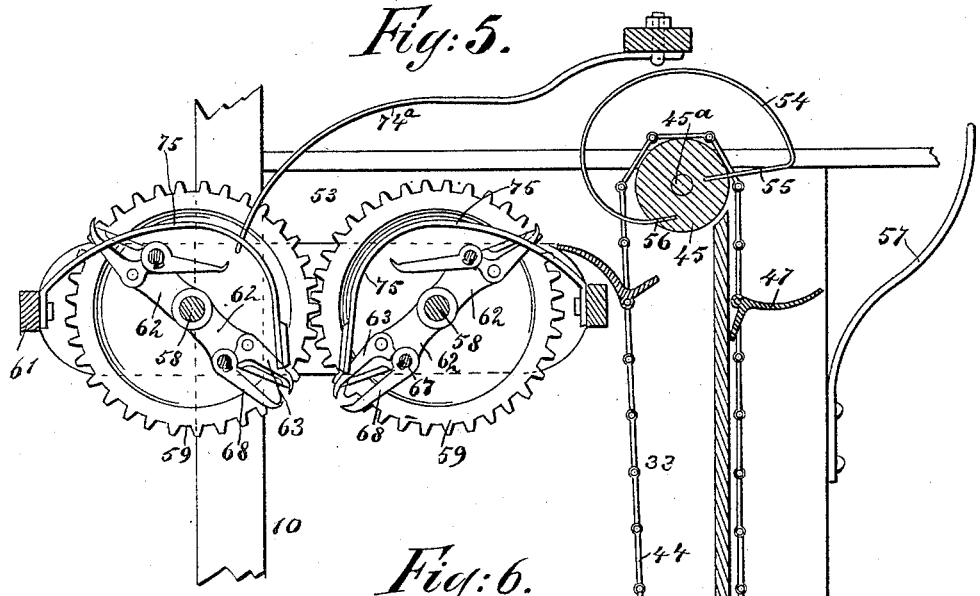
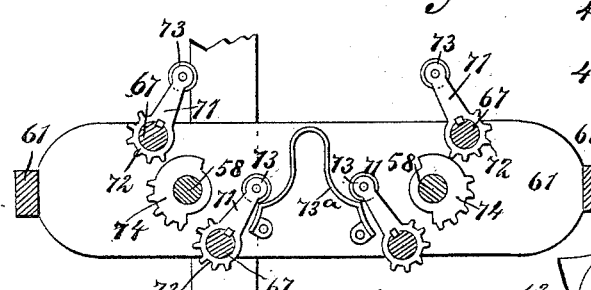
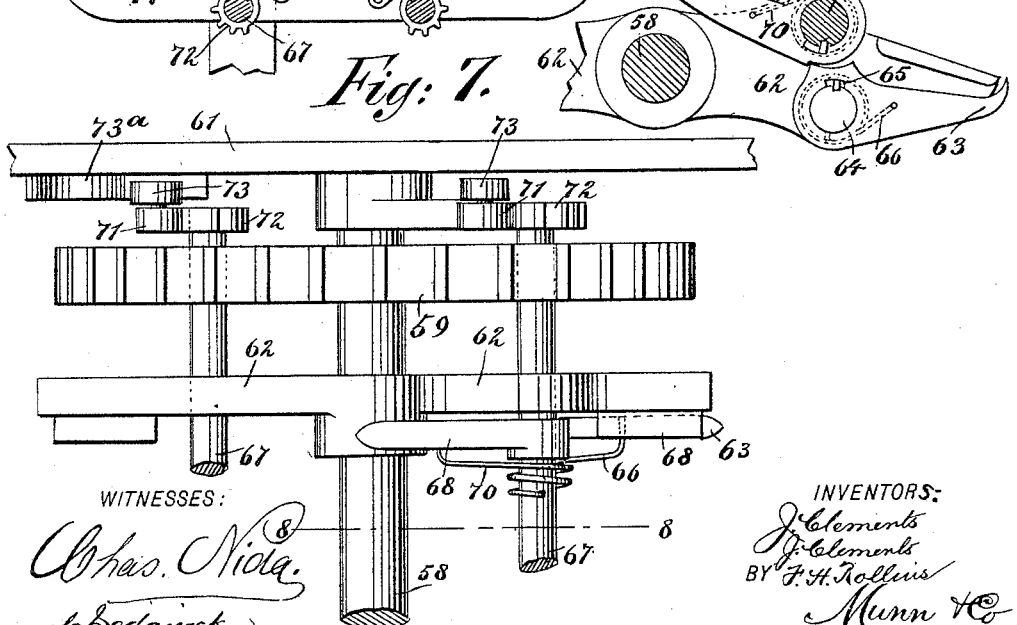

UNITED STATES PATENT OFFICE.

JAMES CLEMENTS, JOHN CLEMENTS, AND FRED. H. ROLLINS, OF LAKE CITY, IOWA.

CORN-HARVESTING MACHINE.

SPECIFICATION forming part of Letters Patent No. 477,169, dated June 14, 1892.

Application filed July 6, 1891. Serial No. 398,539. (No model.)

*To all whom it may concern:*

Be it known that we, JAMES CLEMENTS, JOHN CLEMENTS, and FRED. H. ROLLINS, all of Lake City, in the county of Calhoun and State of Iowa, have invented a new and Improved Corn-Harvesting Machine, of which the following is a full, clear, and exact description.

Our invention relates to improvements in machines for harvesting corn; and the object of our invention is to produce a machine which may be drawn lengthwise over a row of corn and which will pick the ears of corn from the stalks, husk the corn, and deliver the husked ears into an adjacent wagon, box, or other receptacle.

To this end our invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken side elevation of the machine embodying our invention. Fig. 2 is a broken plan view partly in section. Fig. 3 is a broken front elevation partly in section. Fig. 4 is a detail horizontal section showing the arrangement of the stalk feeder and compressor and the means for breaking the ears from the stalks. Fig. 5 is a broken enlarged detail view partly in section, showing the connection between the lifting-elevator and the husker. Fig. 6 is a detail sectional view showing the gear and cam mechanism for operating the husker hooks and claws. Fig. 7 is a broken enlarged plan view showing in detail the mechanism for operating the husker arms, hooks, and claws. Fig. 8 is a broken sectional view on the line 8 8 in Fig. 7, showing the detail construction of one of the husker-arms; and Figs. 9 and 10 are detail views of the ratchet-sprockets on the driving-shaft.

The machine is provided with a main frame 10, which is divided in the middle to permit the passage of cornstalks through it, as hereinafter described, and which is provided with a suitable drawing-pole 11. The frame is mounted upon the axles 12, which axles are secured to the frame and are journaled in the main wheels 13, and these wheels carry sprocket-wheels 14 over which extend the driving-chains 15, which have suitable tightening-pulleys 15ª and which connect with small sprocket-wheels 16, which turn loosely on the shaft 17, extending transversely across the upper portion of the machine-frame. The sprocket-wheels 16 are provided on the inner sides with oppositely-arranged pawls 18, which engage ratchet-wheels 19 on the collars 20, which collars are firmly secured to the driving-shaft 17. The sprocket-wheels are loosely mounted on the shaft and the pawls will cause the shaft to turn with the sprocket-wheels, but will permit the easy turning of the machine at the ends of the rows. These ratchet-sprockets are of common construction and we do not claim them as a part of our invention. The central portion of the shaft 17 is stayed by a main bracket 21, which is supported on the top of the machine-frame and is suitably braced, as best shown in Fig. 3, and mounted loosely on the center of the shaft adjacent to this bracket is a bevel gear-wheel 22, which is adapted to be engaged by a clutch 23, keyed to the shaft in the usual way and operated by a lever 24, and by means of the clutch the machine may be thrown in and out of gear. The gear-wheel 22 meshes with a similar gear-wheel 25 on the top of the feed-roller 26, and this roller is connected with a similar roller 26ª by the gear-wheels 27, so that the rollers will turn in unison. The rollers 26 and 26ª are arranged parallel with each other and extend vertically through the central portion of the machine, as best shown in Figs. 3 and 4, and they are provided with projecting flanges 28, which are arranged longitudinally thereon, and the rollers when turned will assist in feeding the cornstalks through the machine. The rollers 26 and 26ª are arranged adjacent to the beater 40, which will be described below, and the rollers clamp the cornstalks between them and hold the stalks firmly, so that the beater may knock off the ears of corn and the rollers at the same time feed the stalks through the machine.

The machine-frame is divided in the middle by a narrow passage-way 29, which permits the passage of the cornstalks in a partially-erect position, and on each side of the passage-way is a compressing-shoe 30, and the front ends of the shoes terminate in diverging horns 31, which thus serve to gather the cornstalks and guide them between the shoes, and these shoes 30 are placed near enough together so that the stalks of the hills of corn will be separated so as to bring the ears of corn into a suitable position to be plucked by the machine—that is, the stalks will be spread out so as to pass through the machine in single file, and the ears, being wider than the stalks, will thus be brought into position to be knocked off by the beater, as hereinafter described.

One side of the passage-way 29 is closed by a side-board 32, which prevents the plucked ears from dropping in the wrong direction. On the opposite side of the passage-way is an elevator 33, which is adapted to receive the plucked ears and deliver them to the husker, as hereinafter described. The position of the cornstalks 34 and ears 34$^a$ as they pass through the passage-way is clearly shown in Fig. 4.

To feed the stalks readily through the passage-way, the following mechanism is employed: An endless chain belt 35 is provided with projecting flanges 36, which are arranged at intervals thereon, and the belt is carried by sprocket-wheels 37 on the lower ends of the vertical shafts 37$^a$, which are arranged near the front and rear portions of the passage-way 29, and the belt will pass through the passage-way, as shown in Fig. 4, with the flanges nearly filling it, and as the shafts revolve and the belt moves the flanges will engage the cornstalks and push them rapidly through the machine. The rear shaft 37$^a$ is provided at the top with a gear-wheel 38, (shown in Figs. 1 and 2,) which meshes with an idler 39, and the latter meshes with the gear-wheel 27 on the roller 26, so that when the machine is started the rear shaft 37$^a$ will be revolved and will carry the chain 35 and the forward shaft 37$^a$. Directly in front of the roller 26 and arranged parallel therewith is a beater 40, which is provided with projecting cutting-flanges 41, which project into the passage-way 29, and directly opposite this beater is a guard-board 42, and the space between the guard-board and beater is such that the stalks may pass through between them; but an ear of corn cannot pass. Consequently as the beater revolves the flanges will strike the ear at the butt, as shown in Fig. 4, and will break it off and throw it into the elevator 33, so that it will be carried up to the husker. The beater is driven by gearing it to the roller 26; but it may be revolved in any convenient way and should be revolved in a direction opposite to that in which the feed-rollers revolve. The elevator 33 comprises a suitable casing 43, which is open on the side next the passage-way 29, two carrying-belts 44, which run over drum-pulleys 45 and 46, arranged at the upper and lower ends of the elevator, and projecting buckets 47, which are pivoted on the chains and which are adapted to receive the ears and carry them upward and which may drop down when descending, as shown in Fig. 5. The buckets have laterally-extending ends 47$^a$, adjacent to their pivots, which will hold them in a horizontal position when they are ascending. The elevator is driven by a chain 49, which engages a sprocket-wheel 48 on the end of the upper drum-shaft 45$^a$, and this chain belt 49 extends over a sprocket-wheel 50, near the upper portion of the machine, said sprocket-wheel being secured to a short shaft 51, connecting with the main gear-wheel 22 by means of a bevel-pinion 52, and the belt 49 also serves to drive the husker and the elevator, which carries the husked ears to the wagon in the manner hereinafter described. The elevator 33 carries the ears which are unhusked to the husker 53, which husker is arranged in the upper part of the machine-frame, as shown.

The following mechanism is arranged at the top of the elevator to prevent more than one tier of ears at a time from being delivered to the husker. The upper roller 45 of the elevator is provided with a series of curved wires or rods 54, which at one end are doubled over, as shown at 55 in Fig. 5, and are secured to one side of the roller, and the opposite ends of the wires or rods are curved inward, as shown at 56 in the same figure, and secured to the opposite side of the roller. The elevator-buckets 47 are spaced in relation to each other, so that a bucket will pass over the drum 45 at each revolution of the drum, and the guards formed of the curved wires 54 are secured to the drum in such a manner and project sufficiently far so that they will turn out above each ascending bucket and will prevent the ears of corn from riding upon one another on the bucket, as the guards will strike the upper ears and sweep them off the bucket. As the ears are knocked off they will be received by the guide-strip 57, which will carry them back to the elevator, so that they may again fall into a bucket.

The main portions of the husker are carried on two parallel shafts 58, which are arranged adjacent to the top of the elevator 33 and which are geared together by the gear-wheels 59, so that they will revolve in unison, and one of the shafts 58 extends outward through the supplemental frame 61, in which the shafts are mounted, and carries a sprocket-wheel 60, which is driven by the chain belt 49. Each shaft 58 is provided with oppositely-extending arms 62, and each arm terminates in a hook 63, which is sharp at the end and which is pivoted on a stud 64 on the arm, the said hook being secured to the stud by means of a key 65, which fits a wide key-seat in the hook, and thus permits a limited movement of the hook in relation to the arm, and the hook is normally pressed forward by a spring 66, one end of which is secured to the hook and the opposite end to the arm.

The arms on each side of each shaft 58 are provided with a transverse shaft 67, which extends through them, and this shaft carries a series of claws 68, the claws being arranged opposite the hooks 63 and terminating in sharp points 69. It will thus be seen that when the hooks and claws are brought together they will close upon the husks of an ear, if it is placed between them, and will hold it so that when the ear is pulled the husks will be stripped from it. The claws 68 are keyed to the shafts 67, so as to have a limited circumferential movement thereon, and the claws are normally pressed forward by springs 70.

It will be seen that as the hooks 63 and claws 68 are both spring-pressed when they are closed upon an ear of corn they will be capable of a yielding movement, so that they will fit an ear of any size. The ends of the shafts 67 are provided with cranks 71, the ends of the cranks which are secured to the shafts being formed into gears 72, and the opposite ends of the cranks carry trucks 73, which run upon curved cam-tracks 73ª on the ends of the supplemental frame 61, and without following out the continuous movement of each crank it will be understood that the cam-track may be easily arranged so that the cranks will be actuated by the convolutions of the cam-track and will oscillate the shafts 67 so as to close the claws 68 upon the hooks 63 at the proper time. In order to do this, it is only necessary that the crank-shafts be properly timed and the cam-track properly arranged. The movement of the hooks will be followed out below. The hooks and claws are separated by means of the mutilated gears 74, which are pivoted on the frame 61 and which at the proper time engage the gears 72 of the crank 71 and oscillate the shafts 67 so as to throw back the claws 68. The key or lug 65 on the hub of the claw will also engage a similar lug on the hub of the hook (see Fig. 8) and throw back the point of the latter.

The ears of corn are guided between the oppositely-arranged arms 62 on the shaft 58 by the springs 74ª, which are arranged above the husking apparatus and which prevent the ears from riding over the outer set of arms 62, and by the curved springs 75, which at their outer ends are secured to opposite sides of the frame 61 and the inner ends of which project downward between the shafts 58, as best shown in Fig. 5. The ears of corn 34ª after they are husked are prevented from being pulled through beneath the shafts 58 by the depending guards 76, which are secured to the frame 61, as shown in Fig. 3, and which are so near the projecting ends of the springs 75 that they will not permit the passage of an ear of corn between either of them and the shafts 58, and will thus cause the ear to drop between them into the hopper 77; but the husks may be drawn through the guards 76, so as to be carried away from the hopper. These guards are arranged above an inclined hopper 77, into which the husked ears of corn are dropped, and this hopper delivers into the lower end of an elevator 78, which extends upward above the machine and to one side of the same, so as to deliver into an adjacent wagon. This elevator is of the common kind, comprising a case 79, a driving-chain 80, which connects with a sprocket-wheel on the shaft 81, and with a suitable roller at its upper end, and which has projecting flanges 82 to carry forward the corn.

The operation of the machine is as follows: The machine is drawn forward lengthwise over the rows of corn and the projecting horns 31 will gather the cornstalks and guide them into the passage-way 29 between the compressing-shoes 30. The forward movement of the machine will have a tendency to carry the stalks through, but this tendency is augmented by the movement of the carrying-chain 35, and the stalks are brushed rapidly through the machine. By flattening or spreading out the stalks in the manner described the ears are caused to be brought butt foremost against the beater 40, and as the ears cannot pass the guard 42 the beater-flanges strike the butts of the ears and snap them off into the elevator 33. The elevator being in constant motion carries them upward and delivers them one at a time to the husker in the manner described. The ears will be delivered into the husker side first, and as they pass down between the springs 75 of the husker they will be caught by the hooks 63 on the opposite shafts 58 and forced downward, and as they pass between the opposite arms the shafts 67 will be actuated by means of the cranks 71 and the cam-track 73ª, so as to cause the claws 68 to close firmly upon the ears. The husks of the ears will thus be caught between two or more oppositely-arranged clamping devices, and when the arms reach a point where they diverge the husks will be pulled from opposite sides of the ear and will be carried between the guards 76 and the ends of the springs 75, while the ear will drop into the hopper 77 and be delivered into the elevator 78, and from thence into a suitable receptacle prepared to receive it. When the husks are stripped from the ear and are carried forward by the arms 62, the continued movement of the cranks 71 causes the hooks and claws to close firmly upon the husks, so that they will all be pulled between the guards 76 and springs 75, and at this point the free ends of the cranks 71 drop from the cam-tracks 73ª, and thus bring the gears 72 on the shafts 67 into the path of the mutilated gears 74 on the frame 61, and these engage the gears 72 and oscillate the shafts 67, so as to swing open the claws 68 and bring them into position for another operation. The claws and hooks will be thrown wide open when at the outer and upper portion of the husker and the husks, actuated partly by the centrifugal force of the husker and partly by their coming in contact with the outer ends of the springs 75, will be expelled and will fall to the ground.

It will be noticed that none of the ears of corn can pass through the machine on account of the narrow passage-way between the beater and the guard-board 42, and it will be seen, too, that as the ears are delivered side first into the husker they will be readily stripped of their husks, and as a result the machine will operate rapidly and do the work as nicely as it could be done by hand.

Having thus fully described our invention, we claim as new and desire to secure by Letters Patent—

1. A corn-harvester comprising a portable frame having a central passage-way therein, compressor-shoes arranged on opposite sides of the passage-way, a vertical beater having flanges arranged at one side of the passage-way, a guard-board arranged opposite the beater, an elevator adjacent to the guard-board and arranged to deliver into a husker, and an elevator to receive the husked corn from the husker, substantially as described.

2. In a corn-harvester, the picking mechanism comprising a frame having a central passage-way therein, a vertical beater having flanges arranged on one side of the passage-way, flanged rollers arranged opposite each other and adjacent to the beater, and a guard-board arranged opposite the beater, substantially as described.

3. In a corn-harvester, the picking mechanism comprising a frame having a central passage-way therein, a side-board arranged on one side of the passage-way, an elevator arranged opposite the side-board, a vertical revoluble beater mounted in the rear of the side-board, and a guard-board arranged opposite the beater, substantially as described.

4. In a corn-harvester, the picking mechanism comprising a frame having a central passage-way therein, compressor-shoes arranged on opposite sides of the passage-way, said shoes terminating at their front ends in diverging horns, a vertical beater held to revolve on one side of the passage-way, and a guard-board arranged opposite the beater, substantially as described.

5. In a corn-harvester, the combination, with the frame having a central passage-way therein, having compressor-shoes, which terminate at their front ends in diverging horns, of a revoluble beater having flanges arranged on one side of the passage-way, a guard-board arranged opposite the beater, and a feed-belt held to move through the aperture, substantially as described.

6. In a corn-harvester, the combination, with the frame having a central passage-way therein and the compressor-shoes therein, said shoes terminating at their front ends in diverging horns, of a pair of feed-rollers mounted in the passage-way, a carrying-belt held to move through the aperture, a vertical beater arranged on one side of the passage-way, and a guard-board arranged opposite the beater, substantially as shown and described.

7. In a corn-harvester, the combination, with the picking mechanism and the husker, of an elevator arranged to carry the ears from the picker to the husker, said elevator comprising a pair of chains running over pulleys and having buckets pivoted thereon, and projecting guards secured to the upper roller and adapted to turn in the path of the buckets, substantially as described.

8. In a corn-harvester, the combination, with the elevator 33, having a series of buckets pivoted thereon, of guards secured to the upper roller of the elevator and arranged to turn in the path of the buckets, and a guide-strip arranged opposite the upper end of the roller and adapted to guide the ears to the buckets, substantially as described.

9. In a corn-harvester, the husker comprising parallel revoluble shafts having oppositely-extending arms thereon, clamping devices secured to the ends of the arms and adapted to close upon the ears of corn, and guards to prevent the corn from following the clamps, substantially as described.

10. In a corn-harvesting machine, the husker comprising two oppositely-rotating parallel shafts, projecting arms carried by the shafts and terminating in hooks, transverse shafts extending through the arms and carrying claws adapted to close upon the hooks, a cam and gear mechanism for closing and opening the claws, and guards supported near the paths of the hooks and claws, substantially as described.

11. In a corn-harvester, the husker comprising two oppositely-rotating parallel shafts, a plurality of oppositely-arranged arms carried by the shafts, hooks pivoted on the free ends of the arms, transverse shafts extending through the free ends of the arms and carrying claws adapted to close upon the hooks, cranks secured to the ends of the transverse shafts and provided at their attached ends with gears, a cam-track arranged in the path of the cranks, mutilated gears pivoted to the main husker-frame and adapted to engage the crank-gears, and guards supported near the paths of the hooks and claws, substantially as described.

12. In a corn-harvester, the combination, with the husker and the elevator arranged adjacent thereto, of guide-springs arranged above the husker and elevator and oppositely-arranged spring-arms projecting downward between the arms of the husker, substantially as described.

13. The combination, with the husker comprising oppositely-arranged shafts carrying arms having clamping devices at their ends, of guards arranged adjacent to the free ends of the arms and adapted to prevent the corn from following the arms, substantially as described.

14. A corn-harvester comprising a frame having a central passage-way therein, mounted on wheels, compressor-shoes arranged in the passage-way and provided at their front ends with diverging horns, a flanged feeder mounted on one side of the passage-way, a guard-board arranged opposite the beater, feeding mechanism for carrying the stalks through the passage-way, an elevator arranged on one side of the aperture and in front of the guard-board and beater, a husker adapted to receive the corn from the elevator, a hopper arranged to receive the husked corn from the husker, and an elevator to receive the corn from the hopper and deliver it into an adjacent receptacle, substantially as described.

JAMES CLEMENTS.
JOHN CLEMENTS.
FRED. H. ROLLINS.

Witnesses:
C. M. SMITH,
M. A. CHAPMAN.